(12) United States Patent
Schroeder et al.

(10) Patent No.: US 7,514,033 B1
(45) Date of Patent: Apr. 7, 2009

(54) MOLTEN METAL LEVEL BURNER OUTPUT CONTROL FOR ALUMINUM MELT FURNACE (75) Inventors: Karl Schroeder, Columbus Grove, OH (US); Don Rethman, Jackson Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 413 days.

(21) Appl. No.: 11/381,251

(22) Filed: May 2, 2006

(51) Int. Cl.
*C21B 13/00* (2006.01)
*C21B 7/24* (2006.01)

(52) U.S. Cl. .............................. 266/99; 266/44; 266/78; 266/900

(58) Field of Classification Search ................. 266/200, 266/78, 99, 900, 903, 44
See application file for complete search history.

(56) References Cited

U.S. PATENT DOCUMENTS

| | | |
|---|---|---|
| 3,078,669 A * | 2/1963 | Williams .................. 60/39.281 |
| 4,255,133 A | 3/1981 | Tanifuji et al. |
| 4,473,103 A | 9/1984 | Kenney et al. |
| 4,655,436 A | 4/1987 | Williams |
| 5,364,080 A | 11/1994 | Kraemer et al. |
| 5,392,312 A | 2/1995 | Bernet et al. |
| 5,407,000 A | 4/1995 | Mercer, II et al. |
| 5,643,528 A | 7/1997 | Le Gras |
| 5,666,377 A | 9/1997 | Havas et al. |
| 6,148,019 A | 11/2000 | Fishman et al. |
| 6,163,019 A | 12/2000 | Green et al. |
| 6,379,609 B1 | 4/2002 | Stummer |
| 6,585,797 B2 | 7/2003 | Kinosz et al. |
| 6,637,496 B1 | 10/2003 | Macheske et al. |
| 6,666,258 B1 | 12/2003 | Kono |

* cited by examiner

*Primary Examiner*—Scott Kastler
(74) *Attorney, Agent, or Firm*—Rankin, Hill & Clark LLP; Vincent Ciamacco (57) ABSTRACT

A control system and method for controlling a temperature and molten metal height in a gas-fired metal melting furnace whereby metal height and temperature may be more reliably maintained. The control system includes a controller that receives information on metal temperature and metal height. The controller controls metal melting burners so as to operate at different settings between a high output and a low output based upon sensed metal height.

16 Claims, 5 Drawing Sheets

MOLTEN METAL LEVEL BURNER OUTPUT CONTROL FOR ALUMINUM MELT FURNACE

BACKGROUND OF THE INVENTION

1. Field of the Invention

The present invention generally relates to metal melting furnaces and, more particularly, toward a method and system for controlling a metal melting furnace based upon sensed molten metal heights and temperatures to permit more efficient operation of the furnace.

2. Description of Related Art

Figure 1A:
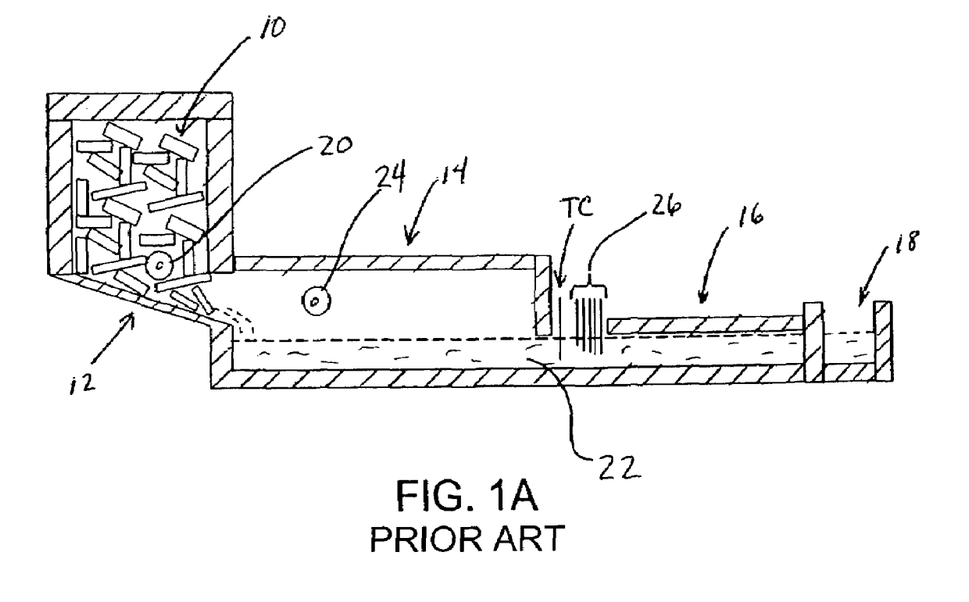
FIG. 1A schematically illustrates a metal melting furnace.

Gas fired metal melting furnaces are well known in the art. One such type of furnace, illustrated in FIG. 1, includes a charging tower 10, a melting area 12, a molten metal holding area 14, and a launder 16 that leads to a ladle or dispensing area 18.

The charging tower 10 is vertically above the melting area 12, and includes a removable cover such that new charging material (i.e., ingots and scrap) to be melted can be introduced into the charging tower 10. Since the charging material is disposed in the tower 10 and vertically above the melting area 12, the charging material is pre-heated prior to reaching the melting area 12, and is thereby brought to the melting temperature more quickly and efficiently.

The melting area 12 disposed at the bottom of the charging tower 10 includes a series of melting burners 20 (only one shown) that heat and melt the charging material. The melting burners 20 are operated at either a high or a low setting. The high setting is matched to the furnace capacity, and essentially corresponds to full-on operation of the melting burners 20 and the furnace. The low setting is a holding setting. Thus, the melting burners 20 are operated either full on, to melt metal as quickly as possible, or at a low setting. It will be appreciated that the furnace is most efficiently operated when the rated capacity is equal to the load, in which case the melting burners are continuously operated at their high or full-on setting. It will further be appreciated that due to varying metal demands, operation at the rated capacity is discontinuous or intermittent. Operation of the melting burners 20 in either the high or low setting is controlled based upon sensed level of the molten metal in the metal holding area 14 or the launder 16, as described hereinafter.

Melted metal flows from the melting area 12 at the bottom of the charging tower 10 into the molten metal holding area 14. The molten metal holding area 14 defines an enclosure including a refractory brick-lined bath that holds a volume of molten metal 22. A holding burner 24 is disposed above the molten metal bath, and is controlled so as to maintain the temperature of the molten metal in the molten metal bath at a predetermined temperature, typically around 1380° F. The holding burner 24 output is adjustable, within limits, based upon sensed metal temperature so as to maintain the molten metal temperature within predetermined desired limits.

Figure 3:
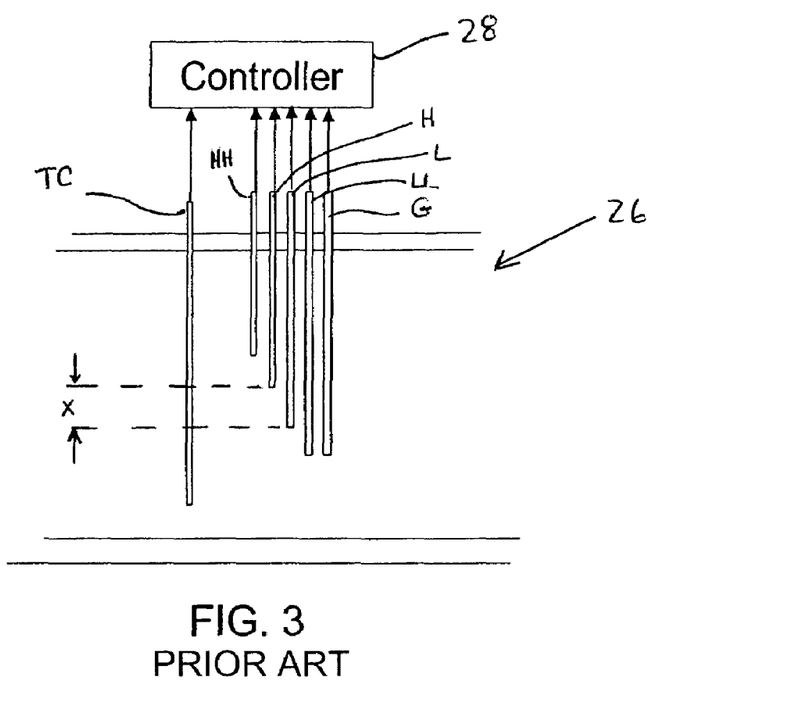
FIG. 3 schematically illustrates a prior art temperature sensing and metal height sensing arrangement used in conjunction with the control system of FIG. 2.

Molten metal level is sensed by a series of probes 26. The probes 26 have different lengths so as to project downwardly different amounts. As shown in FIG. 3, the probes typically include a high-high level probe (HH), a high level probe (H), a low level probe (L), a low-low level probe (LL), and a ground probe (G). Such an arrangement of probes 26 is well know to those skilled in the art.

The high-high level probe (HH) senses a condition in which the level of metal in the bath is too high, and in which the melting burners 20 are turned off (i.e., e-stop the melting furnace) to prevent overfilling the molten metal bath. Essentially, the high-high level probe (HH) is a failsafe probe to help prevent overflowing the bath with molten metal.

The high level probe (H) senses a high-normal level of molten metal in the bath. The high level probe (H) is thus a control probe, and signals from the high level probe (H) are used by the controller 28 to control operation of the melting burners 20, i.e., to turn the melting burners 20 to the low setting or condition.

The low level probe (L) senses a low level of metal in the bath. The low level probe (L) is a control probe, and signals from the low level probe (L) are used by the controller 28 to control operation of the melting burners 20, i.e. to turn the melting burners to the high setting or condition. The low metal signal from the low level probe (L) also indicates an initial low metal level, which the controller uses to generate warning signal for the operator.

The low-low level probe (LL) is the corollary of the high-high level probe (HH), and indicates that the level of metal in the bath is too low, evidencing a problem in the charging tower 10 that requires attention from the operator. Such a problem could be a blockage of charging material, preventing the charging material from reaching the melting burners 20, or simply that the charging tower 10 is empty.

The ground probe (G) is typically identical in length to the low-low level probe, and provides a reference point against which other length measurements are judged. More specifically, electrical current is supplied to the probes and, when the ground probe (G) and a particular level probe (L-HH) are touching the molten metal, completes a circuit that generates a signal identifying the level of metal in the bath.

Figure 1B:
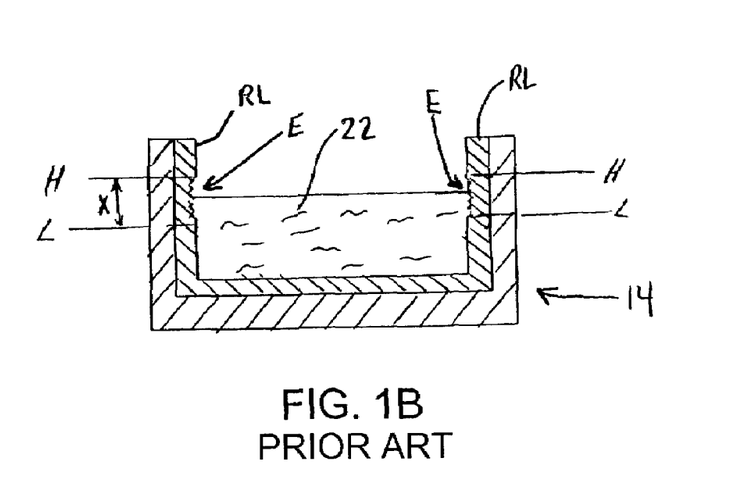
FIG. 1B schematically illustrates erosion of a refractory lining of the melting furnace.

Thus, the level of metal ordinarily fluctuates a distance (X) between the low level (sensed by the low level probe (L)) in which the melting burners 20 are operated full-on, and the high level (sensed by the high level probe (H)) in which the melting burners 20 are operated on low. Unfortunately, repeated cycling or rising/falling of the metal level in the bath between the high level and the low level erodes the refractory lining (RL) of the metal holding area 14 and, over time, requires rebuilding of the metal holding area lining. Such erosion (E) is schematically illustrated in FIG. 1B. Naturally, rebuilding the refractory lining (RL) is expensive and requires the metal melting furnace to be taken off-line for an extended period of time. Accordingly, it is desirable to reduce erosion of the refractory lining (RL) and thereby extend the time between rebuilding of the refractory lining.

Figure 2:
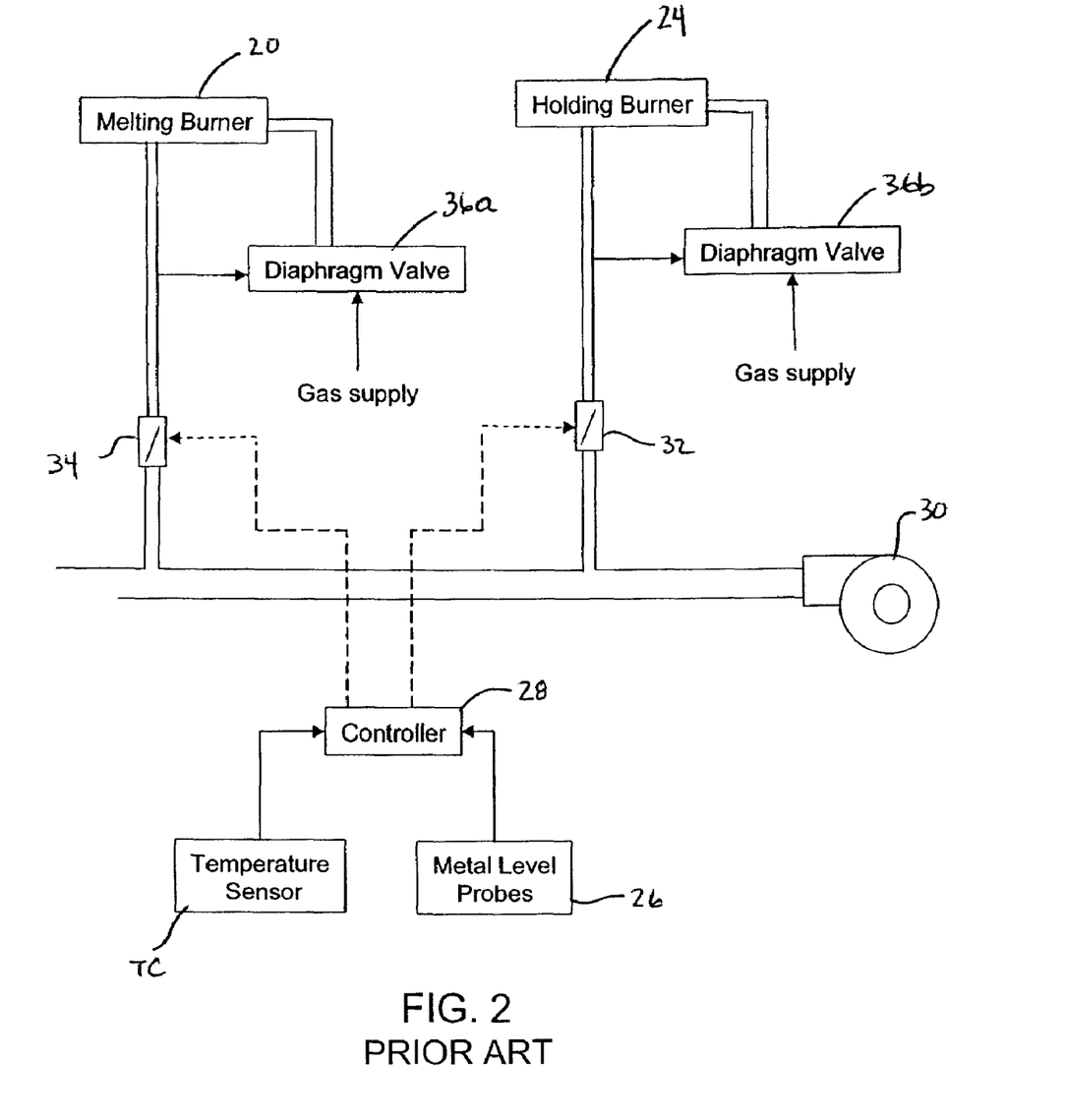
FIG. 2 schematically illustrates a prior art control system.

With respect to FIG. 2, the melting furnace includes a control system including the controller 28, an air blower 30, a series of air valves 32, 34 (only two shown), a series of diaphragm-type gas valves 36a, 36b (only two shown), a temperature sensor (thermocouple; TC) and the probe-type level sensors 26, described previously. The air valves 32, 34 are butterfly type valves including a motor that is operable to drive the butterfly valves open and closed. The melting burner air valve 34 is a two position valve that is moved into a either a full-open position, corresponding to the high or full-on setting of the burner, or a closed position (slightly open) corresponding to the low setting of the burner. The holding burner air valve 32 is a proportioning valve that may be moved to a position between the full open and closed (low) positions. Each of the air valves 32, 34 is associated with one of the gas valves 36a, 36b and with one of the melting or holding burners 20, 24.

Thus, the holding burner 24 has its own dedicated holding burner air valve/holding burner gas valve combination. Similarly, each melting burner 20 has its own dedicated melting burner air valve/melting burner gas valve combination. The controller 28 receives signals from the temperature sensor (TC) for controlling operation of the holding burner air valve/ gas valve, and from a charging tower atmosphere temperature sensor (not shown) with interlocks from the level sensing probes 26 for controlling operation of the melting burner air valves/gas valves, and for operating various alarms and indicators in response to high-high and low-low molten metal conditions, described briefly hereinbefore.

The air blower 30 is continuously operated, and supplies air to each of the air valves 32, 34. The melting burner air valves 34 are two positions valves, and are either in a low open or a high open setting, corresponding to low and high operation of the melting burner 20, respectively, as noted previously. In either case, an air stream flows from the melting burner air valves 34 to the associated melting burner 20. Part of the air stream flowing to each melting burner 20 is tapped off to the associated melting burner gas valve 36a, which is a diaphragm valve, and serves as a pneumatic or air signal that controls opening of the diaphragm valve and communication of gas to the melting burner 20.

As is known in the art, the diaphragm valve 36a opens an amount that corresponds to the air signal provided to it. Thus, when a low amount of air is provided (corresponding to the air valve 34 being at the low setting), the diaphragm valve 36a opens a first amount so as to supply a first, low amount of gas to the melting burner 20. The first, low amount of gas is tuned to the air flow (i.e., air flowing to the melting burner 20 from the melting burner air valve 34) and, thus, the correct air/gas ratio is supplied to the melting burner 20, and the melting burner 20 is efficiently operated in the low setting. Similarly, when a high amount of air is provided to the diaphragm valve 36a (corresponding to the air valve 34 being at the high setting), the diaphragm valve 36a opens a second amount so as to supply a second, high amount of gas to the melting burner 20. The second, high amount of gas is tuned to the air flow (i.e., air flowing from the air valve 34 to the melting burner 20) and, thus, the correct air/gas ratio is supplied to the melting burner 20, and the melting burner 20 is operated in the high setting.

The holding burner air valve/gas valve may be operated identically to the melting burner air valve/gas valve, described above. However, and as noted previously, it is also known in the art to use a fully proportioning butterfly valve for the air valve 32, and to adjust the opening/closing amount of the air valve 32 via a motor that is actuated by the controller in response to sensed metal temperature. Such a known air valve actuating mechanism includes a link rod assembly (not shown) that is secured to the air valve 32 and mechanically establishes the high and low open positions for the air valve 32. In any event, the air stream flows from the holding burner air valve 32 to the holding burner 24. Part of the air stream flowing to the holding burner 34 is tapped off to the holding burner gas valve 36b, which is a diaphragm valve, and serves as an air signal for the diaphragm valve 36b.

The holding burner diaphragm gas valve 36b receives the air signal tapped off from the output of the holding burner air valve 32 and opens a corresponding amount, and the correct air/gas mixture is supplied to the holding burner 24. Unfortunately, adjusting the link-rod type assembly is a manual operation that is imprecise and problematic. Notably, manually adjusting one of the high or low setpoint changes the other setpoint (i.e., low or high) and requires repeated readjustment and re-checking with each change. Improper adjustment of the link rod assembly causes the high and low setpoints or limits to deviate from the actual high and low opening positions of the air valve 32, and may result in undue cycling of the metal temperature between the high and low limits. Such cycling is believed to cause undue oxidation of the melted metal, and is therefore to be avoided. Therefore, there exists a need in the art for an improved and simpler control over the holding burner output, and resulting better control over the temperature of the molten metal.

SUMMARY OF THE INVENTION

The present invention is directed toward a method and control system for a metal melting furnace that provides improved control over operation of the melting burners and holding burners.

The control system according to the present invention includes a melting burner air valve assembly having an air valve that is driven between a high setting and a low setting by a servo-motor. The controller receives metal height signals from a sensor arrangement, and actuates the servo-motor based upon the metal height signals to move the air valve between at least the high setting and a setting between the high and low settings.

The control system also includes a holding burner air valve assembly having an air valve that is controllably moved by a servo-motor to a position between a high setting and a low setting based upon metal temperature. The controller receives temperature signals from a temperature sensor, and actuates the servo-motor based upon the sensed temperature signals to open/close the air valve an appropriate corresponding amount so as to reliably maintain the metal temperature within desired limits.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 4:
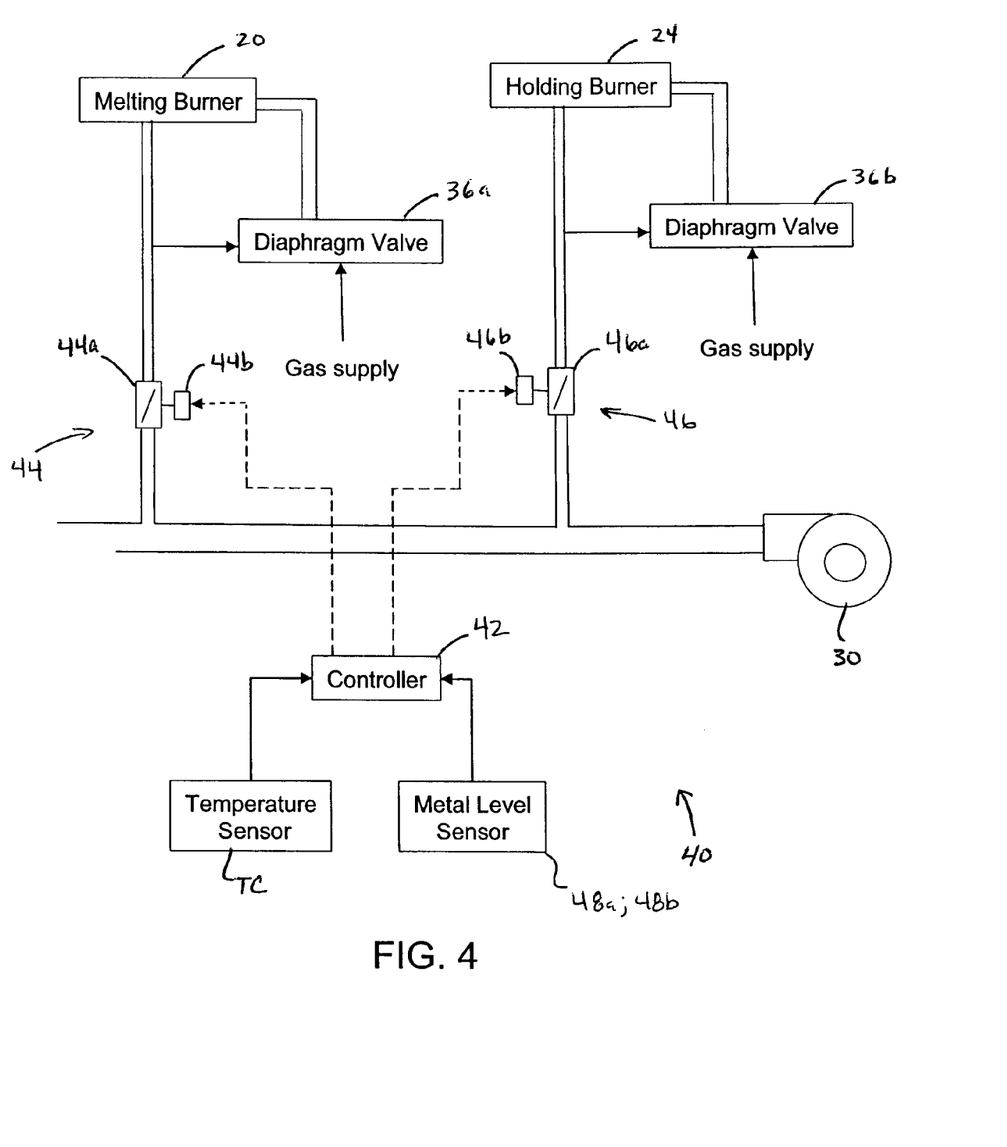
FIG. 4 schematically illustrates a control system of the present invention.
Figure 5:
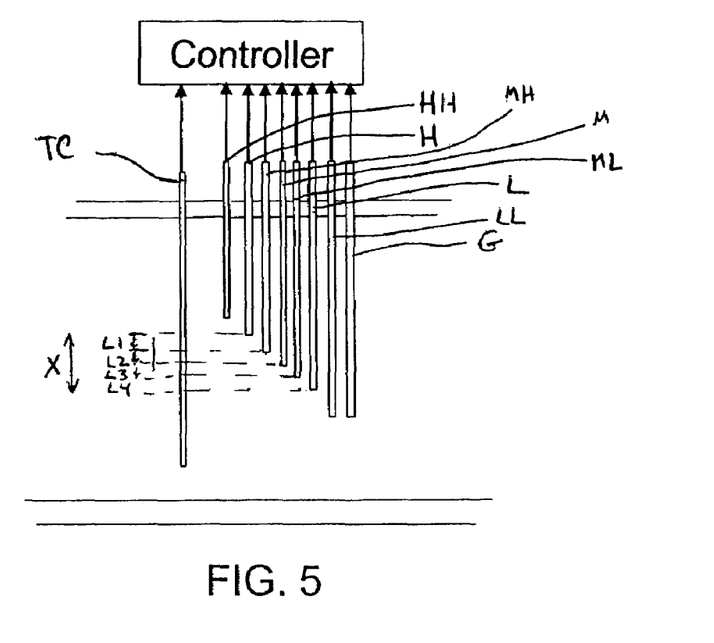
FIG. 5 schematically illustrates a first embodiment of a metal height sensing system of the present invention, used in conjunction with the control system of FIG. 4; and, FIG. 6 schematically illustrates a second embodiment of a metal height sensing system of the present invention, used in conjunction with the control system of FIG. 4.
Figure 6:
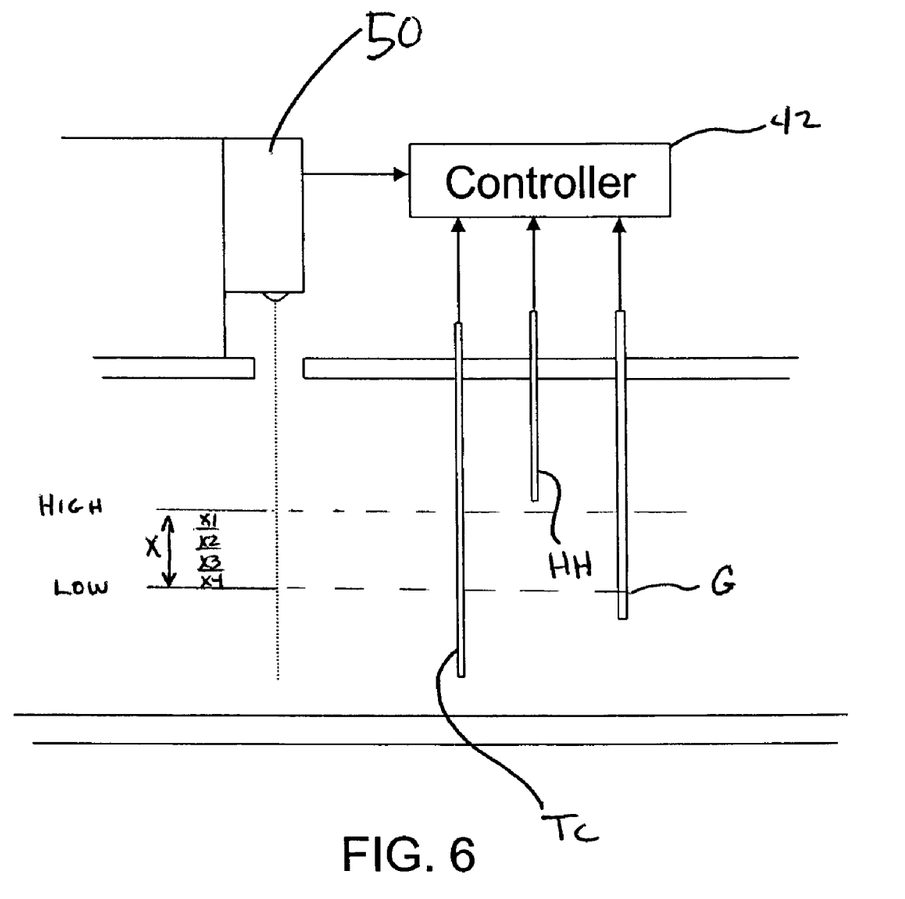

With reference to FIGS. 4-6, the illustrated metal melting furnace control system 40 is operable to control melting of metal and retain molten metal at a predetermined temperature. The overall structure of the metal melting furnace is generally identical to that described hereinbefore and common reference numbers will be used where appropriate. Furthermore, the diaphragm-type gas valves 36a, 36b and burners 20, 24 described previously are unchanged, and their features and operation will not be described at length hereinafter.

The metal melting furnace control system 40 includes a controller 42, a series of melting burner air valve assemblies 44 (one illustrated), a holding burner air valve assembly 46, a metal level sensor arrangement 48a, 48b, and the temperature sensor (thermocouple; TC). Each of the melting burner air valve assemblies 44 includes an air valve 44a, which is preferably a butterfly-type valve, and a servo-motor actuator 44b. The holding burner air valve assembly 46 also includes an air valve 46a, which preferably is a butterfly-type valve, and a servo-motor actuator 46b. The servo-motor actuators 44b, 46b may be feedback type or non-feedback type servo motors. The melting burner air valve servo-motors 44b are actuated in parallel or common by the controller 42 to open the associated air valves 44a a set amount in response to sensed molten metal height or level. The holding burner air valve servo-motor 46b is actuated by the controller 42 independently of the melting burner air valve servo-motors 44b in response to sensed metal temperature to open the holding burner air valve 46a a set amount.

Thus, and as will be apparent from the following description, the controller 42, which preferably is a programmable logic controller (PLC), includes a computer program that controls operation of the burners 20, 24 in response to sensed molten metal height and temperature, so that metal height and temperature is maintained within desired limits. In the present invention, the method of maintaining metal temperature is identical, and will be described next.

The temperature sensor (TC) sends a signal to the controller 42 indicative of the temperature of the molten metal exiting the holding area 14 of the furnace and entering the launder 16. As will be appreciated by those skilled in the art of metal molding or casting operations, it is important to maintain the metal temperature within fairly tight tolerances, as this effects flowability and moldabilty of the metal. In an aluminum melting furnace, as in the present invention, the molten metal is preferably maintained at a temperature of about 1380° F. However, the temperature of the metal may vary in response to various factors, such as metal melting rate, rate of dispensing or use of the molten metal, opening of the furnace, and charging of new material via the charging tower 10.

In any event, the controller 42 receives the temperature signal from the temperature sensor (TC), and actuates the holding burner air valve 46a via the associated servo-motor 46b to control operation the holding burner 24. Thus, when the temperature signal received by the controller 42 indicates that the temperature of the metal is greater than or equal to the setpoint temperature (i.e. 1380° F.), the holding burner air valve 46a will be moved to a small opening amount (i.e., 10% open), as it is not necessary to further heat the molten metal. When the temperature of the metal falls below a first predetermined temperature (e.g., 1378° F.) the controller 42 will operate the holding burner air valve 46a to a larger opening (e.g., 25% open). Similarly, when the temperature falls to a second predetermined temperature (e.g., 1375° F.) the controller 42 will actuate the holding burner air valve 46a to open further (e.g., 50% open). Upon falling below a third predetermined temperature (e.g., 1373° F.), the controller 42 will actuate the holding burner air valve 46a to open still further (e.g., 75% open). Sensed temperature below a fourth predetermined temperature (e.g., 1370° F.) will cause the controller to actuate the air valve 46a to full-open, which corresponds to the holding burner being operated full-on. As the amount of holding burner air valve opening is directly correlated to opening of the gas valve 36b, the holding burner output is directly and reliably effected by the controller manipulating the position or open-amount of the air valve 46a. In this way, the temperature of the molten metal is maintained within desired limits, while sufficient capacity is retained to permit the metal to be heated should the temperature fall. Naturally, the temperatures and holder burner air valve opening amounts recited herein are merely exemplary or illustrative, and are not to be construed as limiting the scope of the present invention.

Two different methods and arrangements 48a, 48b for measuring metal heights are described hereinafter. In accordance with a first embodiment, while the metal temperature is sensed and controlled as described hereinbefore, molten metal level is sensed by a first arrangement comprising a series of level sensing probes. For example, the level sensing probes described hereinbefore could be used. According to this embodiment, when a low metal level is sensed by the low probe (L), the controller 42 actuates the melting burner air valve servo-motors 44b to move the melting burner air valves 44a into a high or full-open setting, and the melting burners 20 are operated full-on. However, when a high metal level is not sensed by the high probe (H) (i.e., metal level between high and low levels), the controller 42 actuates the melting burner air valve servo-motors 44b to move the melting burner air valves 44a into a mid-range position, which is between the full-open and the low setting), and thereby operates the melting burners 20 at a mid-range setting intermediate full-on and low. The mid-range setting will be maintained while metal level is in the range 'X' of FIG. 3 (i.e., between high and low levels). Operating the melting burners at the mid-range setting, which is impossible with the two-position valve implementations known in the art, will help maintain the metal liquid level closer to the high metal level, and reduce fluctuations in the metal levels.

As will be appreciated, using the known number and arrangement of level probes art provides limited information to the controller 42 regarding the molten liquid level in the normal operating range (i.e., between high and low metal levels). However, adding further metal height sensing probes to measure metal high between the high level sensed by the high probe and the low level sensed by the low probe will provide more sensitive metal level data to the controller 42, and thereby permit fine-tuning of the desired mid-range operation of the melting burners 20.

For example, and with reference to FIG. 5, the level sensor arrangement 48a adds three further probes, which will be referred to as a mid-high probe (MH), mid probe (M), and mid-low probe (ML), wherein the mid probe (M) senses metal height halfway between the low probe (L) and the high probe (H), the mid-high probe (MH) senses metal height halfway between the mid probe (M) and the high probe (H), and the mid-low probe (ML) senses metal height halfway between the mid probe (M) and the low probe (L).

With this level sensing arrangement 48a, the controller 42 can more accurately respond to sensed conditions. More specifically, the controller 42 actuates the melting burner air valves 44a, via the servo-motors 44b, so as to respond in real time to changes in the metal level, and thereby better maintain the metal level within fairly tight tolerances.

For example, should a high metal level be sensed by the high probe (H), the controller will actuate the melting burner air valves 44a to open 10%, which will be deemed the low setting. Should metal level be sensed to be within a mid-high range (L1) by the mid-high level probe (MH), the controller 42 will actuate the melting burner air valves 44a to open to 25%. Similarly, upon sensing metal levels in a mid range (L2) or low range (L3), the controller will cause the air valves 44a to move to 50% or 75% open, respectively. Upon sensing metal height at or below the low level with the low level probe (L), the air valves 44a will be opened 100%. Naturally, and as noted previously, open position of the air valves 44a is correlated to the opening position of the gas valves 36a and, thus is directly related to melting burner operation. Thus, the response of the melting burners 20 is staged or controlled in response to actual changes in metal levels, rather than cycling between high and low metal levels, as in the prior art. However, the furnace capacity remains unchanged, and the rated capacity remains as high as before. Employing such a staged response reduces metal level fluctuations, and reduces the amount of time that the furnace melting burners 20 are operated at the high setting, and is thereby more efficient than the full-on and low settings of the prior art.

With reference to FIG. 6, in a second embodiment, and with the metal temperature sensed and controlled as discussed previously, the molten metal level sensing arrangement 38b includes laser sensor 50, which is able to measure metal heights at a sensitivity of at least tenths, and preferably hundredths, of an inch. In this arrangement 38b, none of the metal level sensing probes, except the high-high level sensing probe (HH) and the ground probe (G), remain in the control system 40. The high-high level probe (HH) is retained and serves to notify the controller 42 that the metal bath is overfull, as may be necessary should the laser sensor 50 fail. Thus, the high-high level probe (HH) serves as a backup to prevent overfilling of the metal bath, which in an extreme case would cause molten metal to overflow the bath and spill out around the furnace.

By sensing molten metal level with the laser sensor 50, the controller is provided with highly accurate information on the metal height that can be used to more effectively and efficiently control the metal height within tight limits. Preferably, the laser sensor 50 provides the controller 42 with a real-time, continuous signal of the current molten metal height. The controller 42 actuates the melting burner air valves 44a to a predetermined opening amount based upon the sensed metal height. For example, and with reference to FIG. 6, between the high metal level (HIGH) and the low metal level (LOW) established previously, four ranges could be established whereby in a first range of metal heights (X1) the controller actuates the melting burner air valves 44a to open a first amount (e.g., 10%); in a second range of metal heights (X2) the controller actuates the melting burner air valves 44a to open a second amount (e.g. 25%), in a third range of heights the controller 42 actuates the melting burner air valves 44a to open a third amount (e.g., 50%), and in the fourth range of heights (X3), adjacent the low metal level (LOW), the controller 42 actuates the melting burner air valves 44a to open a fourth amount (e.g., 75%). At or below the low metal level (LOW) the controller will actuate the melting burner air valves 44a to the full open (i.e., 100%) setting.

Naturally, the present invention is not limited to four ranges, or to the opening amounts set forth herein. Rather, it is considered apparent that the number of height ranges, and the degree of melting burner air valve opening will be implemented and adjusted as appropriate, without departing from the scope and spirit of the present invention. In this regard, the ranges of metal heights and associated valve opening amounts are preferably stored in the memory of the PLC or controller 42 so as to be easily accessed and adjusted by the user. As such, upon receiving a height signal from the laser sensor 50, the controller 42 will select and implement the appropriate response (i.e., moving the air valves to the corresponding position).

For example, it is contemplated that, instead of implementing ranges of metal heights, the controller 42 actuate the air valves 44a, via the servo-motors 44b, so as to open an amount that is proportional to the metal height between the high metal height position and the low metal height position. It is further contemplated that the controller could monitor changes in metal height and weight the response so as to respond to the changes. In this way, should the metal level be found to be falling, the controller would implement a procedure to increase the air valve opening amount by a factor such that the air valve 44a is opened more than would otherwise be the case. On the other hand, should the metal level be found to be rising, the controller would implement a procedure to decrease the air valve opening amount by a factor such that the air valve 44a would close more than would otherwise be the case. In this way it is expected that the controller 42 response will be proactive and anticipate changes in metal height, and thereby be even more effective in maintaining the metal height within close tolerances.

In another alternative, it is contemplated that the controller of the prior art could be modified to include a PLC timer that would be operable to control the two-position prior art valve 32 so as to provide a rather crude intermediate positioning of the air valve 34 between the high and low settings, which is otherwise not available in the prior art melting burner air valve control system. For example, and understanding that it takes a predetermined amount of time to move the melting burner air valve 32 from a low position to a high position, when an intermediate setting of the air valve 32 is desired, the PLC timer would be operable to energize the valve for only a portion of the 12 second opening time (i.e., 4 seconds, 6 seconds, etc.). In this way, an estimated intermediate setting for the two position prior art valve could be provided, without implementing the servo-motor actuator described hereinbefore, and therefore would provide for operation of the melting burner at a setting between high and low.

It is further contemplated that this alternative control arrangement could be expanded such that a PLC timer or time setting could be associated with each metal probe (H, MH, M, ML, L) to drive the valve open different amounts that roughly correspond to the sensed metal height. With such a modified alternative arrangement, when metal height is high (H), the air valve 32 would remain at the low-open position. When metal height is sensed to be at a mid-high level via the mid-high probe (MH), the PLC timer would operate the air valve to open for a fraction of the 12 second opening time (i.e., 3 seconds). From this level, should it be sensed that metal height is at the mid level via the mid level probe (M), the PLC timer would operate the air valve 32 to open for another three seconds. Similar actuation would happen upon metal height falling to mid-low level and subsequently to the low level. Reverse timed actuation of the air valve 32 would occur upon rising metal levels. Thus, the implementation of the PLC timer into the PLC, as described above, would provide a somewhat crude series of estimated intermediate settings for the air valve 32, without requiring the servo motor actuator described hereinbefore. Naturally, similar actuation of the air valve 32 could be provided while measuring metal heights with the laser level sensor 50 described hereinbefore.

From the foregoing, it should be apparent that the aforementioned preferred embodiments of the present invention are capable of numerous alternatives and substitutions without departing from the scope and spirit of the present invention. Therefore, the present invention is not limited to the particular preferred embodiments described herein, but rather is only defined by the claims appended hereto.

What is claimed is:

1. A control system for maintaining molten metal height in a gas fired metal melting furnace, comprising:
a sensor arrangement that is operable to sense a plurality of metal heights;
a melting burner air valve assembly comprising an air valve and a servo-motor that is operable to adjust the air valve between a high position and a low position;

a melting burner gas valve that is opened an amount in dependence upon the opening amount of the air valve;

a melting burner that receives air output from said air valve and gas output from said gas valve; and, a controller that receives signals from the sensor arrangement indicative of the metal height, and is operable to actuate the servo-motors to move the air valve into any one of a plurality of positions based upon said sensed metal heights, said plurality of positions including a high position and a position between the high position and a low position.

2. The control system according to claim 1, wherein said sensor arrangement includes a plurality of level sensing probes, said probes being adapted to measure a particular metal height.

3. The control system according to claim 1, wherein said sensor arrangement includes a laser sensor that is adapted to measure metal height.

4. The control system according to claim 2, wherein said plurality of level sensing probes includes a high probe, which is adapted to sense a high metal level, and a low probe, which is adapted to sense a low metal level.

5. The control system according to claim 4, wherein said plurality of level sensing probes includes an additional probe that is adapted to sense a metal level between the high metal level and the low metal level.

6. The control system according to claim 3, wherein the controller includes a program correlating ranges of metal heights with air valve opening amounts, and wherein the sensed height is used to select an associated air valve opening amount.

7. A method for controlling an air valve for a melting burner of a gas-fired metal melting furnace, comprising the steps of:

providing a sensor arrangement that is operable to sense a molten metal height between a high metal level and a low metal level;

providing a controller that is adapted to receive a metal height signal from said sensor arrangement and generate control instructions based thereon;

providing an air valve assembly including the air valve and a servo-motor, said air valve being movable between a high position and a low position, said servo-motor being actuated by said controller so as to move said air valve into a desired opening position, wherein said desired opening position is in a range of positions including the high position and a position between the high position and the low position;

moving said air valve assembly into a position between said high and low positions based upon sensed metal height.

8. The method according to claim 7, wherein said controller correlates ranges of metal heights with air valve opening amounts, and comprising the further steps of:

communicating sensed metal height to said controller;

using said sensed metal height to select the desired air valve opening amount corresponding to a range of metal heights that said sensed metal height is a member of; and, moving said air valve into the position corresponding to the range of metal heights.

9. A control system for maintaining molten metal height in a gas fired metal melting furnace and for maintaining molten metal temperature within prescribed limits, comprising:

a sensor arrangement that is operable to sense a plurality of metal heights;

a temperature sensor for sensing a temperature of the molten metal;

a melting burner air valve assembly comprising a melting burner air valve and a melting burner servo-motor that is operable to adjust the melting burner air valve between a high position and a low position;

a melting burner gas valve that is opened an amount in dependence upon the opening amount of the melting burner air valve;

a melting burner that receives air output from said melting burner air valve and gas output from said melting burner gas valve;

a holding burner air valve assembly comprising a holding burner air valve and a holding burner air valve servo-motor that is operable to adjust the holding burner air valve between a high position and a low position;

a holding burner gas valve that is opened an amount in dependence upon the opening amount of the holding burner air valve;

a holding burner that receives air output from said holding burner air valve and gas output from said holding burner gas valve; and, a controller that receives signals from the sensor arrangement indicative of the metal height and signals from the temperature sensor indicative of metal temperature, and is operable to actuate the melting burner air valve servo-motor to move the melting burner air valve into any one of a plurality of positions based upon said sensed metal heights, and is operable to actuate the holding burner air valve servo-motor to move the holding burner air valve into any one of a plurality of positions based upon said sensed temperature, said plurality of positions including a high position and a position between the high position and a low position.

10. The control system according to claim 9, wherein said sensor arrangement includes a plurality of level sensing probes, said probes being adapted to measure a particular metal height.

11. The control system according to claim 9, wherein said sensor arrangement includes a laser sensor that is adapted to measure metal height.

12. The control system according to claim 10, wherein said plurality of level sensing probes includes a high probe, which is adapted to sense a high metal level, and a low probe, which is adapted to sense a low metal level.

13. The control system according to claim 12, wherein said plurality of level sensing probes includes an additional probe that is adapted to sense a metal level between the high metal level and the low metal level.

14. The control system according to claim 11, wherein the controller includes a program correlating ranges of metal heights with melting burner air valve opening amounts and correlating metal temperature with holding burner air valve opening amounts, and wherein the sensed height is used to select an associated melting burner air valve opening amount and wherein the sensed temperature is used to select an associated holding burner air valve opening amount.

15. The controls system according to claim 5, wherein a normal metal height range is a range in which normal operation of the gas fired metal melting furnace is conducted, wherein said high metal level is a highest metal height within the normal metal height range, and said low metal height is a lowest metal height within the normal metal height range.

16. The controls system according to claim 13, wherein a normal metal height range is a range in which normal operation of the gas fired metal melting furnace is conducted, wherein said high metal level is a highest metal height within the normal metal height range, and said low metal height is a lowest metal height within the normal metal height range.

* * * * *